(12) United States Patent
Roller

(10) Patent No.: US 11,867,104 B1
(45) Date of Patent: Jan. 9, 2024

(54) MOTORCYCLE EXHAUST PIPE HEAT PAD

(71) Applicant: John A. Roller, Cocoa Beach, FL (US)

(72) Inventor: John A. Roller, Cocoa Beach, FL (US)

( * ) Notice: Subject to any disclaimer, the term of this patent is extended or adjusted under 35 U.S.C. 154(b) by 272 days.

(21) Appl. No.: 17/530,989

(22) Filed: Nov. 19, 2021

Related U.S. Application Data

(63) Continuation-in-part of application No. 17/470,662, filed on Sep. 9, 2021, now abandoned.

(51) Int. Cl.
*F01N 13/14* (2010.01)
*F16L 59/02* (2006.01)

(52) U.S. Cl.
CPC .......... *F01N 13/14* (2013.01); *F16L 59/021* (2013.01); *F01N 2260/20* (2013.01)

(58) Field of Classification Search
CPC .......... F01N 13/00; F01N 13/14; F01N 13/16; F01N 13/18; F01N 2260/20; F16L 59/02; F16L 59/021
See application file for complete search history.

(56) References Cited

U.S. PATENT DOCUMENTS

| 4,023,821 A | | 5/1977 | Eiland | |
|---|---|---|---|---|
| 4,955,193 A | * | 9/1990 | Hoeptner, III | B60K 13/04 60/320 |
| 2004/0045756 A1 | * | 3/2004 | Martin | B62J 23/00 180/219 |
| 2005/0115625 A1 | | 6/2005 | White | |
| 2010/0176573 A1 | * | 7/2010 | Melton | B62J 37/00 280/304.3 |
| 2020/0217443 A1 | * | 7/2020 | Lubenow | F16L 43/001 |

FOREIGN PATENT DOCUMENTS

| CN | 218669526 U | * | 3/2023 |
|---|---|---|---|
| KR | 101353288 B1 | * | 2/2014 |
| KR | 20160128717 A | * | 11/2016 |

OTHER PUBLICATIONS

Description Translation for KR 101353288 from Espacenet (Year: 2014).*

* cited by examiner

*Primary Examiner* — Jason D Shanske
*Assistant Examiner* — Daniel M. Keck
(74) *Attorney, Agent, or Firm* — Sanchelima & Associates P.A.; Christian Sanchelima; Jesus Sanchelima

(57) ABSTRACT

A motorcycle exhaust pipe heat pad including a shield assembly, and a fastening assembly is disclosed herein. Fastening assembly include a plurality of fasteners. Shield assembly includes shield made of an insulating heat material such as silicone to protect user from heat of motorcycle exhaust pipes. Shield has a cylindrical mounting shape. Shield has decorative ridges on an outer surface. Shield has predetermined diameters to couple to different exhaust pipes. Plurality of fasteners are disposed on the shield assembly and allow to secure the shield to a motorcycle double exhaust pipe, to a motorcycle single exhaust pipe or to a motorcycle curved exhaust pipe.

4 Claims, 5 Drawing Sheets

MOTORCYCLE EXHAUST PIPE HEAT PAD

OTHER RELATED APPLICATIONS

The present application is a continuation-in-part of pending U.S. patent application Ser. No. 17/470,662, filed on Sep. 9, 2021, which is hereby incorporated by reference.

BACKGROUND OF THE INVENTION

1. Field of the Invention

The present invention relates to a motorcycle exhaust pipe heat pad and, more particularly, to a motorcycle exhaust pipe heat pad that include a pad that can be attached to the exhaust pipe of motorcycles.

2. Description of the Related Art

Several designs for motorcycle exhaust pipes heat pads have been designed in the past. None of them, however, include a motorcycle exhaust pipe heat pad that is mounted to an exhaust pipe of a motorcycle to protect a user from heat of the exhaust pipe.

Applicant believes that a related reference corresponds to U.S. patent No. 2005/0115625A1 issued for a protection to the exhaust pipe to improve engine performance. Applicant believes that another related reference corresponds to U.S. Pat. No. 4,023,821 issued for a shield mounted on the muffler or exhaust pipe and is made of an aluminum extrusion. None of these references, however, teach of a motorcycle exhaust pipe heat pad that includes a pad made of a heat insulating material.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a motorcycle exhaust pipe heat pad that provides protection to a user from heat of a motorcycle exhaust pipe.

It is another object of this invention to provide a motorcycle exhaust pipe heat pad that decorates a motorcycle exhaust pipe.

It is still another object of the present invention to provide a motorcycle exhaust pipe heat pad that can be easily mounted to any motorcycle exhaust pipe.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
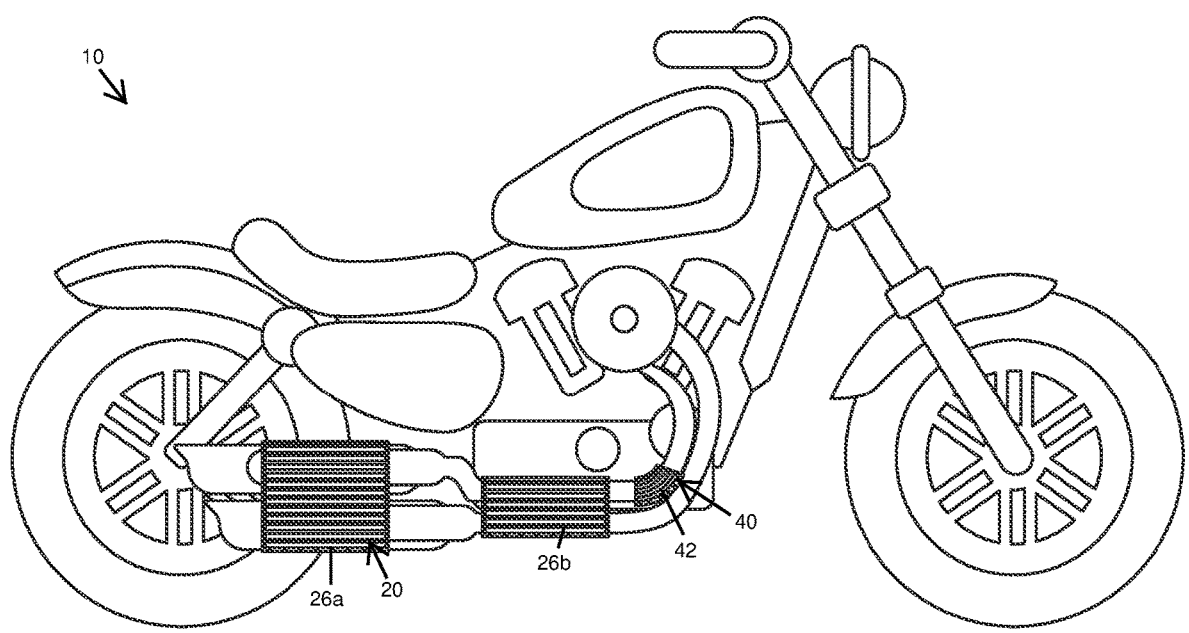
FIG. 1 represents an isometric operational view of one of the preferred embodiments of the present invention 10 showing first shield assembly 20 mounted onto motorcycle exhaust pipes and second shield assembly 40 mounted to a curved exhaust pipe.

Referring now to the drawings, where the present invention is generally referred to with numeral 10, it can be observed that it basically includes a first shield assembly a second shield assembly 40 and a fastener assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
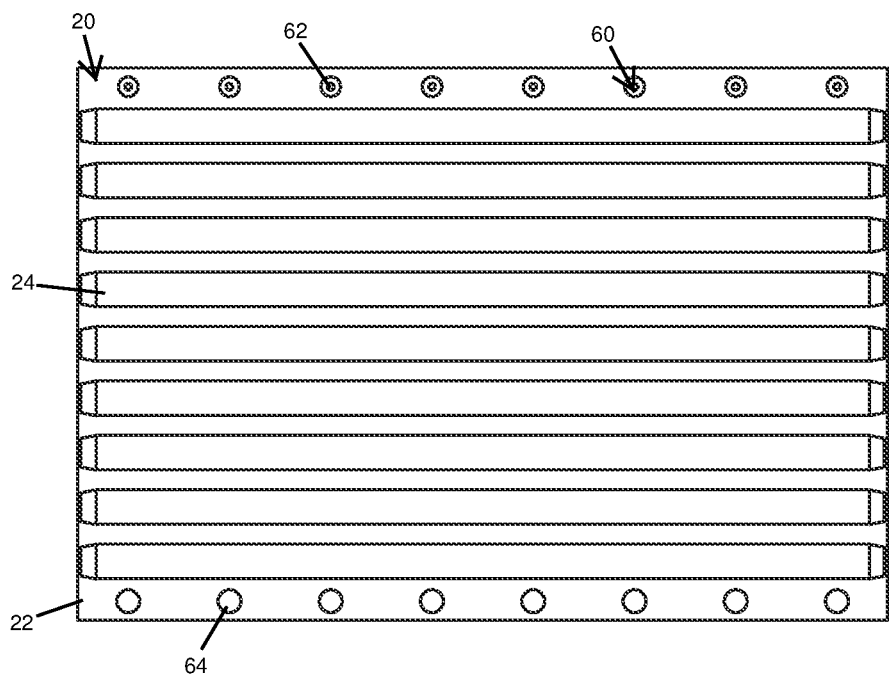
FIG. 2 shows a front view of the first shield assembly 20 in an unfolded configuration showing the fastener sockets 62 and fastener plugs 64.

Best observed in FIG. 2, one of the preferred embodiments for the first shield assembly 20 includes a first shield 22. In one embodiment, the first shield 22 may have a rectangular shape. It also may be suitable to have first shield assembly 22 having an oval shape, a triangular shape, a trapezium shape, an irregular shape or any other shape. The first shield 22 may have a top end and a bottom end. A front face of the first shield 22 may have a plurality of ridges 24 disposed along a width of the first shield 22. The plurality of ridges 24 may be equally spaced. Each ridge of the plurality of ridges may have an elongated shape. Each ridge of the plurality of ridges 24 may have distal ends with a trapezoidal shape. Each ridge of the plurality of ridges may have a length substantially equal as the length of first shield 22. It should be understood that the plurality of ridges 24 may have any other shape such as triangular shape, oval shape, circular shape, waves shape, irregular shapes or the like. It should be understood that the plurality of ridges 24 may be different one to each other. The plurality of ridges 24 may be disposed in any way along a face of the first shield 22. The plurality of ridges 24 may be decorative ridges. The plurality of ridges 24 may be manufactured by molding, manually, 3D print or the like. It should be understood that the plurality of ridges 24 may also be affixed to show logos, insignias, drawings, or any other artwork that a user wants for the first shield 22. In a preferred embodiment, first shield assembly 20 may be made of a silicone or any other material with a low thermal conductivity such as cork, cotton, wood fibers, glass wool, cellulose, rock wool, polystyrene foam, urethane foam, vermiculite, perlite or the like.

Figure 3:
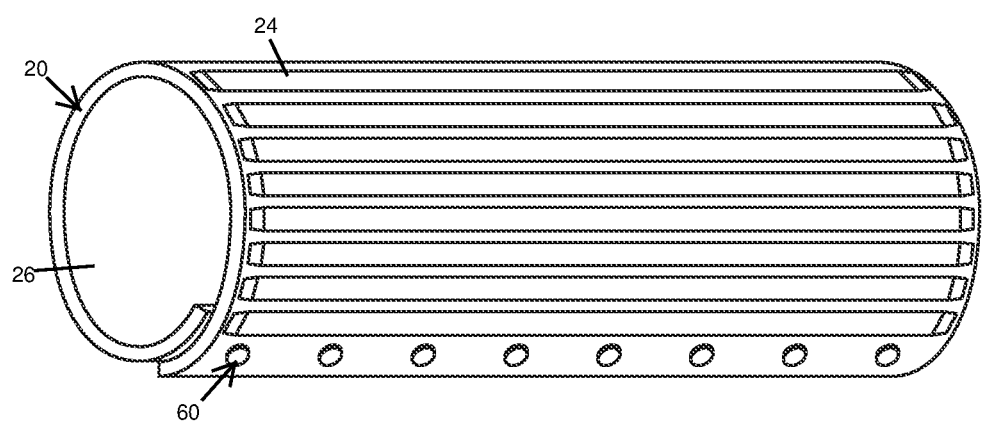
FIG. 3 illustrates an isometric view of the first shield assembly 20 in a wrapped configuration secured by fastener assembly 60.

Best observed in FIG. 2 and FIG. 3, fastener assembly 60 includes fastener sockets 62 and fastener plugs 64. In one embodiment fastener sockets 62 may be snap button sockets and the fastener plugs 64 may be snap button plugs. Other embodiments for fastener socket 62 and fastener plugs 64 may include magnets, buttons or any other variation thereof. The top end of the first shield 22 may include fastener sockets 62 disposed thereon. Fastener sockets 62 may be equally spaced along length of top end of first shield 22. The bottom end of the first shield 22 may have fastener plugs 64 disposed thereon. Fastener plugs 64 may be equally spaced along length of bottom end of first shield 22. Fastener plugs 64 and fastener sockets 62 of first shield may cooperate to removably secure top end and bottom end of first shield 22 by wrapping the first shield thereby defining cylindrical shield 26. It should be understood that width of the first shield 22 may have different lengths to couple the first shield 22 to different motorcycles exhaust pipes as shown in FIG. 1. In one embodiment, first cylindrical shield 26a may have a length of 12 inches and a width of 23 inches to couple onto a double motorcycle exhaust pipe. Second shield 26b may have a length of 12 inches and a width of 9 inches to couple onto a motorcycle exhaust pipe.

Figure 4:
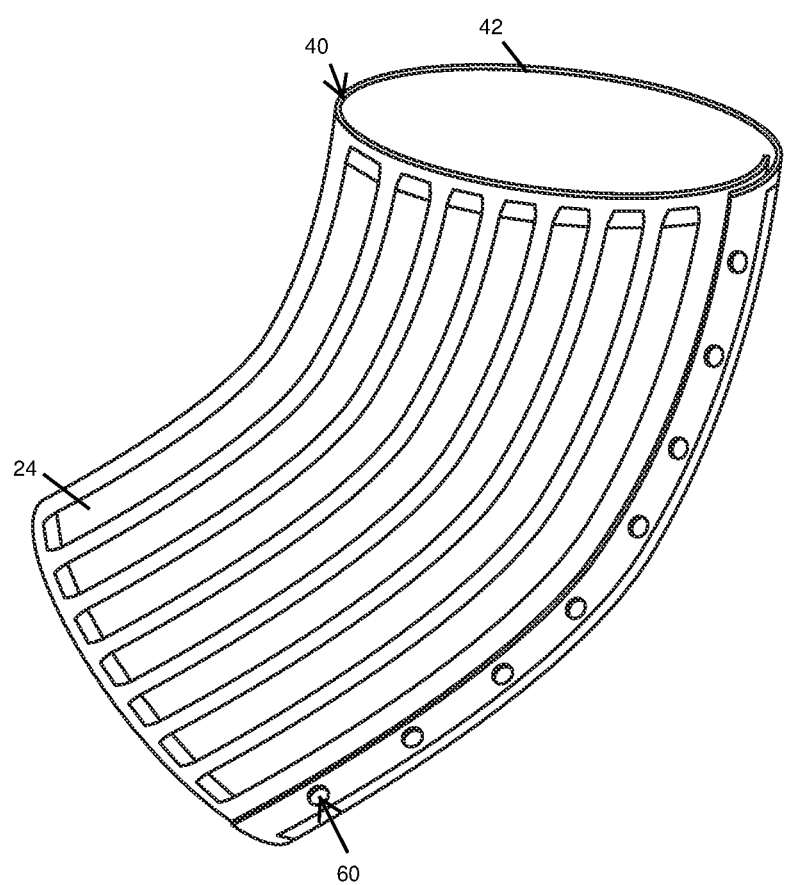
FIG. 4 is a representation of an isometric view of the second shield assembly showing the second shield 42 in a wrapped configuration secured by fastener assembly 60.

Second shield assembly 40 includes second shield 42. FIG. 4 shows a wrapped configuration of second shield 42 to couple second shield 42 to a curved pipe of motorcycle exhaust pipe. Second shield 42 may also have the plurality of ridges 24. Second shield 42 has a curved tubular shape to mount onto curved pipe of motorcycle exhaust pipe to protect footwear of user. Second shield 42 may be secured to curved pipe via the fastener assembly 60 disposed on ends of second shield 42. In a preferred embodiment, second shield assembly 40 may be made of a silicone or any other material with low thermal conductivity such as cork, cotton, wood fibers, glass wool, cellulose, rock wool, polystyrene foam, urethane foam, vermiculite, perlite or the like.

Figure 5:
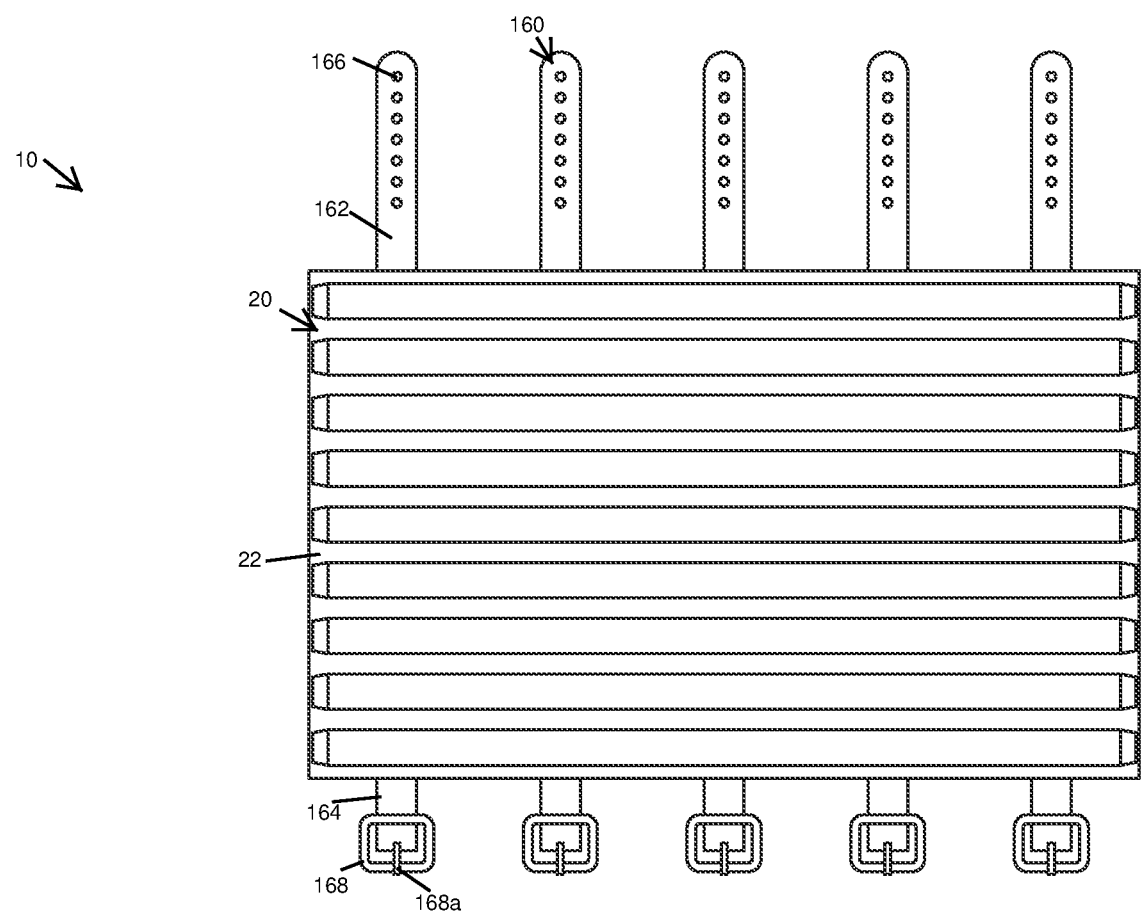
FIG. 5 is a front view of an alternative embodiment of the present invention showing an alternative fastener assembly 160.

Best observed in FIG. 5 an alternative embodiment of the present invention 10 may include alternative fastener assembly 160. Alternative fastener assembly 160 may include first straps 162 and second straps 164. First straps 162 may have an elongated shape. First straps 162 may be made of leather, polystyrene foam, urethane foam or any other suitable material preferably with low thermal conductivity. Each first strap 162 may have openings 166 along a length. Openings 166 may have circular shape or any other shape. Distal end of each first strap 162 may be rounded. It also may be suitable to have distal end of first straps 162 with any other shape. First straps 162 may be attached to a top edge of the first shield 22. First straps 162 may be equally spaced along top edge of first shield 22. Second straps 164 may be made of leather, polystyrene foam or any other material preferably with low thermal conductivity. Second straps 164 may be attached to bottom edge of first shield 22. Second straps 164 may be equally spaced along bottom edge of first shield 22. Distal end of each second strap 164 includes buckle 168 having a prong 168 to cooperate with openings 166 to securing first shield 22 to motorcycle exhaust pipe. Second fastener assembly 160 may also be attached to second shield assembly 40 to secure second shield assembly to a curved motorcycle exhaust pipe. Second fastener assembly 160 can secure first shield assembly 20 and second shield assembly 40 varying a diameter of wrapped first shield assembly 20 and wrapped second shield assembly 40 by coupling prong 168a into different opening 166.

Figure 6:
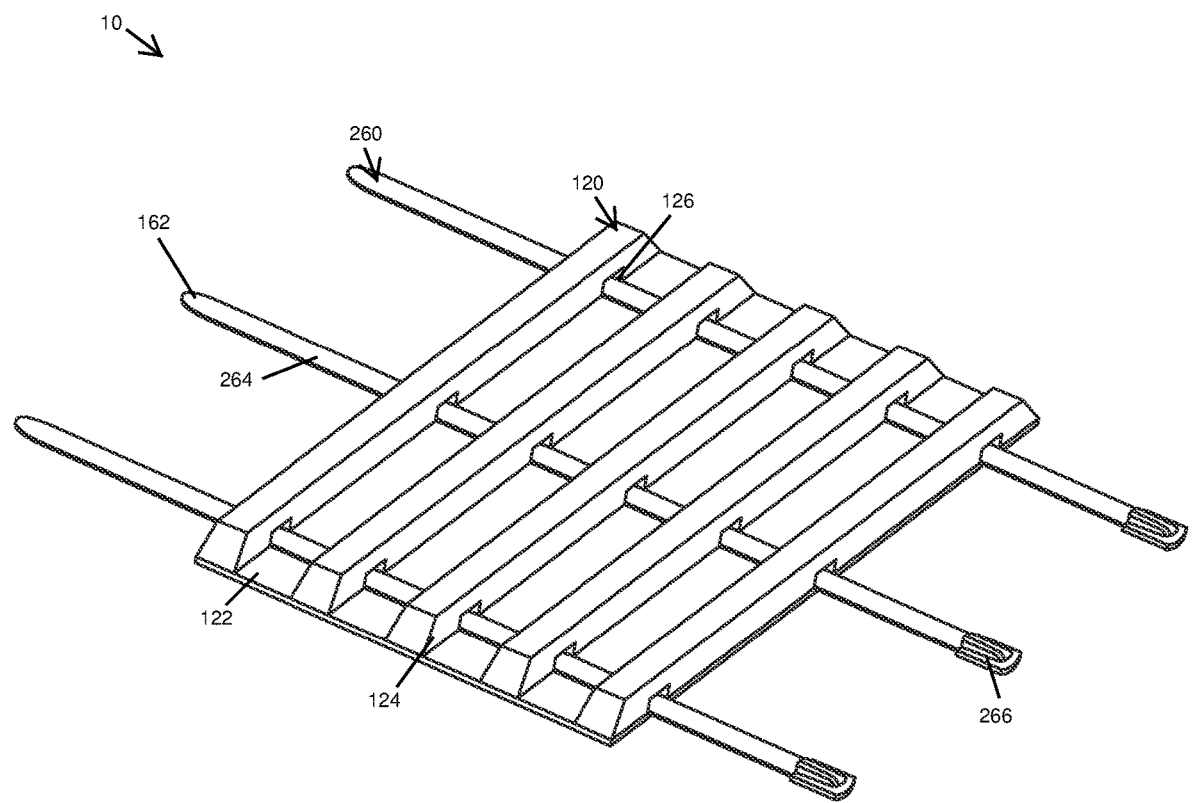
FIG. 6 is an isometric view of another alternative embodiment of the present invention 10 showing an alternative shield assembly 120 and second alternative fastener assembly 260.

Best observed in FIG. 6 another alternative embodiment of the present invention 10 may include second alternative fastener assembly 260 and alternative shield assembly 120. Alternative shield assembly 120 includes alternative shield 122. Alternative shield 122 may have a rectangular shape. Alternative shield assembly 120 may further include protruding members 124. Protruding members 124 may be disposed along length of alternative shield assembly 120. Each protruding member 124 may have a substantially elongated cuboid shape. Each protruding member 124 may have a length substantially equal as length of alternative shield 122. Each protruding member 124 may have distal ends with a chamfer. Each protruding member 124 may have cuts 126 disposed on lateral sides. Alternative shield assembly 120 may be made of a silicone or any other material with a low thermal conductivity such as cork, cotton, wood fibers, glass wool, cellulose, rock wool, polystyrene foam, urethane foam, vermiculite, perlite or the like. Second alternative fasteners 260 may include alternative fasteners 262. Alternative fasteners 262 may have elongated members 264 with zip tie ends 266. Alternative fasteners 262 may be placed through cuts 126 to wrap and secure alternative shield assembly 120. It should be understood that fastener assembly 60, alternative fastener assembly 160 and second alternative fastener assembly 260 may be selectively used for wrapping and fastening first shield assembly, second shield assembly 40 or alternative shield assembly 120.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A motorcycle exhaust pipe heat pad, comprising:
   a fastening assembly including a plurality of fasteners; and
   a shield assembly including a shield, said shield is made of an insulating heat material, said shield includes said plurality of fasteners, wherein said plurality of fasteners are zip tie fasteners, wherein said shield assembly is made of silicone, wherein said shield has a plurality of protruding members disposed along a length of the shield extending from a distal end to a proximal end of said shield and spaced therebetween, said protruding members having openings, wherein said fasteners go through said openings, wherein said shield has rectangular shape, said shield is configured to be wrapped onto a motorcycle exhaust pipe and secured via the plurality of fasteners, said fasteners protrude outwardly from lateral sides of said shield.

2. The motorcycle assembly exhaust pipe heat pad of claim 1, wherein said shield assembly has a cylindrical mounting shape.

3. The motorcycle assembly exhaust pipe heat pad of claim 1, wherein said shield has a curved tubular mounting shape.

4. A motorcycle exhaust pipe heat pad, consisting of:
   a fastening assembly including a plurality of fasteners; and
   a shield assembly including a shield, said shield has a rectangular shape, said shield is made of an insulating heat material, said shield includes said plurality of fasteners, wherein said plurality of fasteners are zip tie fasteners, said shield is configured to be wrapped onto a motorcycle exhaust pipe and secured via the plurality of fasteners, wherein said shield assembly is made of silicone, wherein said shield has a plurality of protruding members disposed along a length of the shield extending from a distal end to a proximal end of said shield and spaced therebetween, said protruding members are longitudinal and have a rectangular shape with tapered distal and proximal ends, said protruding members having openings, wherein said fasteners go through said openings, said fasteners protrude outwardly from lateral sides of said shield, said plurality of fasteners are perpendicular to said protruding members.

\* \* \* \* \*